(12) United States Patent
Beck et al.

(10) Patent No.: US 7,660,768 B2
(45) Date of Patent: Feb. 9, 2010

(54) TIME-OF-TRANSACTION FOREIGN CURRENCY CONVERSION

(75) Inventors: Philip D. Beck, Lido Beach, NY (US);
Paul Noblett, Fort Lauderdale, FL (US);
Michael McCormack, Fort Lauderdale, FL (US)

(73) Assignee: Planet Payment, Inc., Long Beach, NY (US)

(*) Notice: Subject to any disclaimer, the term of this patent is extended or adjusted under 35 U.S.C. 154(b) by 1070 days.

(21) Appl. No.: 10/704,342

(22) Filed: Nov. 7, 2003

(65) Prior Publication Data

US 2004/0148255 A1    Jul. 29, 2004

Related U.S. Application Data

(60) Provisional application No. 60/424,477, filed on Nov. 7, 2002, provisional application No. 60/457,742, filed on Mar. 26, 2003.

(51) Int. Cl.
*G06Q 40/00* (2006.01)
*G06K 5/00* (2006.01)
(52) U.S. Cl. .................. 705/44; 705/39; 235/380
(58) Field of Classification Search ............. 705/39, 705/41, 44, 35, 26, 1; 235/380, 379, 375, 235/492
See application file for complete search history.

(56) References Cited

U.S. PATENT DOCUMENTS

| | | | | |
|---|---|---|---|---|
| 5,477,038 A | * | 12/1995 | Levine et al. | 235/380 |
| 5,991,410 A | * | 11/1999 | Albert et al. | 705/17 |
| 6,018,717 A | * | 1/2000 | Lee et al. | 705/41 |
| 6,205,433 B1 | | 3/2001 | Boesch et al. | |
| 6,450,407 B1 | * | 9/2002 | Freeman et al. | 705/14 |
| 6,721,715 B2 | | 4/2004 | Nemzow | |
| 2002/0099656 A1 | | 7/2002 | Wong | |
| 2002/0174031 A1 | * | 11/2002 | Weiss | 705/26 |
| 2002/0194124 A1 | * | 12/2002 | Hobbs et al. | 705/39 |

(Continued)

FOREIGN PATENT DOCUMENTS

EP    1018711 B1    12/2001

(Continued)

OTHER PUBLICATIONS

Jolson Merchant Partners "Making Money by Moving Money: Investing in the Payment Industry" Aug. 2001.*

(Continued)

*Primary Examiner*—Kelly Campen
(74) *Attorney, Agent, or Firm*—Fenwick & West LLP

(57) ABSTRACT

Providing a time-of-transaction currency conversion from a merchant's local currency to a cardholder's credit card currency uses a conversion rate developed by reference to the particular merchant, acquirer, card association and issuer. After a merchant has generated an authorization request in the merchant's currency for a transaction by a cardholder in a different currency, the transaction amount in the authorization is converted from the merchant's currency to the currency of the cardholder's issuing currency, and optionally modified to include additional fees. The converted authorization request is then transmitted to the appropriate card association and then to the issuing bank for authorization, with a response returned to the merchant. The cardholder sees and approves the transaction in the cardholder's currency, and in an amount identical to the amount for which he will be billed.

50 Claims, 15 Drawing Sheets

U.S. PATENT DOCUMENTS

2005/0049963 A1  3/2005  Barry

FOREIGN PATENT DOCUMENTS

| EP | 1251470 A2 | 10/2002 |
|---|---|---|
| GB | 2373879 A | 10/2002 |
| GB | 2368960 | 5/2005 |
| WO | WO-97/04411 | 2/1997 |
| WO | WO 97/48078 | 12/1997 |
| WO | WO-98/36368 | 8/1998 |
| WO | WO02/39395 A2 | 5/2002 |
| WO | WO 02/097752 | 12/2002 |
| WO | WO 03/067535 | 8/2003 |
| WO | WO-2004/008372 A2 | 1/2004 |
| WO | WO-2004/008399 A2 | 1/2004 |
| WO | WO-2004/042590 A1 | 5/2004 |

OTHER PUBLICATIONS

Banham, Russ "Hidden liabilities" Jun. 1996, International Business v9n6 pp. 20-23.*

Branch, Shelly "Save on travel deals after you take off" Jan. 1997, Money v26n1 pp. 127.*

Yang, et al. "Managing the exchange risks of international transactions" Jun. 1998, Mid-Atlantic Journal of Business v34n2 pp. 141-162.*

Supplementary European Search Report, Nov. 15, 2005, 3 pages.

PCT International Search Report for International Application No. PCT/US03/35553, Oct. 4, 2004, 3 pages.

* cited by examiner

| Field | Name | Length | Format | Comments |
|---|---|---|---|---|
| 1 | Record Type | 2 | N | Two digit indicator indicating record type (Type 01 = Acquirer Identification) |
| 2 | Sequence Number | 4 | N | Four digit sequence number sequentially incremented |
| 3 | Acquirer ID | 4 | N | Numeric Identifier |
| 4 | Acquirer Name | 32 | AN | Textual Identifier |
| 5 | Status | 1 | AN | A = Active<br>I = Inactive<br>C = Closed |
| 6 | Date of last status change | 8 | N | Mmddyyyy |

*Fig. 6A*

| Record Type | Sequence Number | Acquirer ID | Description | Status | Date of last status change |
|---|---|---|---|---|---|
| 01 | 0001 | 0001 | First Bank of America | A | 06012002 |
| 01 | 0002 | 0002 | Confederate Bank | A | 08152002 |
| 01 | 0003 | 0003 | First Horizon | A | 09012002 |
| 01 | 0004 | 0004 | Bank of New Amsterdam | A | 09182002 |
| 01 | 0005 | 0005 | Bank of Toronto | A | 10012002 |

*Fig. 6B*

| Field | Name | Length | Format | Comments |
|---|---|---|---|---|
| 1 | Record Type | 2 | N | Two digit indicator indicating record type |
| 2 | Sequence Number | 4 | N | Four digit sequence number sequentially incremented |
| 3 | Rate Table ID | 6 | N | Rate table numeric identification |
| 4 | Rate Table Load Date | 8 | N | Mmddyyyy |
| 5 | Acquirer ID | 4 | N | Numeric identification |
| 6 | Acquirer Base Rate Group | 3 | N | Base rate group number that allows for multiple rate sets per rate table and acquirer. |
| 7 | Merchant ID | 16 | N | Merchant ID for merchant-specific rates. If blank, rates are at processor ID/acquirer base rate group level |
| 8 | Card Type | 2 | AN | VI=Visa<br>MC = MasterCard<br>AX = Amex<br>DC = Diners Club<br>CB = Carte Blanche |
| 9 | Currency From | 3 | N | ISO currency code of currency rate is expressed from |
| 10 | Currency to | 3 | N | ISO currency code of currency rate is expressed to |
| 11 | Base Rate | 11 | N | Base Rate |
| 12 | Rate Source | 2 | AN | Rate Source indicator assigned by PP MAS |
| 13 | Interval A Rate | 11 | N | Interval A rate value |
| 14 | Interval A Duration | 2 | N | Interval A duration Clearing Date – Auth Date > Value |
| 15 | Interval B Rate | 11 | N | Interval B rate value |
| 16 | Interval B Duration | 2 | N | Interval B duration Clearing Date – Auth Date > Value |
| 17 | Interval C Rate | 11 | N | Interval C rate value |
| 18 | Interval C Duration | 2 | N | Interval C duration Clearing Date – Auth Date > Value |

*Fig. 7A*

| Record Type | Sequence Number | Rate Table ID | System Rate Load Date | Processor | Processor Base Rate Group | Domestci Merchant I.D. | Card Type | Currency From | Currency To | Base Rate | Rate Source |
|---|---|---|---|---|---|---|---|---|---|---|---|
| 7 | 1 | 100001 | 8202002 | | 1 | 1 | VI | 826 | 840 | 1.588 | VI |
| 7 | 2 | 100001 | 8202002 | | 1 | 1 | VI | 840 | 826 | 0.6297 | VI |
| 7 | 3 | 100001 | 8202002 | | 1 | 1 | MC | 826 | 840 | 1.58 | MC |
| 7 | 4 | 100001 | 8202002 | | 1 | 1 | MC | 840 | 826 | 0.6329 | MC |

| Interval A Rate | Interval A Duration | Interval B Rate | Interval B Duration | Interval C Rate | Interval C Duration | Interval D Rate | Interval D Duration | Interval E Rate | Interval E Duration |
|---|---|---|---|---|---|---|---|---|---|
| 1.588 | 2 | 1.538 | 5 | 1.470 | 10 | 1.428 | 21 | 1.388 | 60 |
| 0.6297 | 2 | 0.65 | 5 | 0.680 | 10 | 0.700 | 21 | 0.720 | 60 |
| 1.580 | 2 | 1.536 | 5 | 1.468 | 10 | 1.424 | 21 | 1.379 | 60 |
| 0.6329 | 2 | 0.651 | 5 | 0.681 | 10 | 0.702 | 21 | 0.725 | 60 |

*Fig. 7B*

| Field | Name | Length | Format | Comments |
|---|---|---|---|---|
| 1 | Record Type | 2 | N | Two digit indicator indicating record type |
| 2 | Sequence Number | 4 | N | Four digit sequence number sequentially incremented |
| 3 | Domestic Merchant ID | 16 | N | Merchant's base account I.D. used with their domestic acquirer |
| 4 | Acquirer ID | 4 | N | Numeric Identification |
| 5 | Merchant Base Currency | 3 | A | ISO currency code, merchant's base currency |
| 6 | Mark-up Method | 2 | AN | Mark-up method indicator, corresponding to mark-up method table |
| 7 | Foreign Merchant ID | 16 | N | Merchant ID assigned to merchant for that acquirer and base currency. |
| 8 | Foreign MID Clearing currency | 3 | N | ISO currency code of clearing currency corresponding to the foreign MID |

*Fig. 8A*

| Record Type | Sequence Number | Base MID | Acquirer | Merchant Base Currency | Mark-up Method | Foreign MID | Foreign MID Clearing Currency |
|---|---|---|---|---|---|---|---|
| 04 | 0001 | 123456789 | 0001 | 840 | AA | 8321450001 | 826 |
| 04 | 0002 | 123456789 | 0001 | 840 | AA | 8321450002 | 392 |
| 04 | 0003 | 123456789 | 0001 | 840 | AA | 8321450003 | 036 |
| 04 | 0004 | 123456789 | 0001 | 840 | AA | 8321450004 | 344 |
| 04 | 0005 | 123456789 | 0001 | 840 | AE | 8321450005 | 702 |
| 04 | 0006 | 123456789 | 0001 | 840 | AA | 8321450006 | 978 |

*Fig. 8B*

| Field | Name | Length | Format | Comments |
|---|---|---|---|---|
| 1 | Record Type | 2 | N | Two digit indicator indicating record type |
| 2 | Sequence Number | 4 | N | Four digit sequence number sequentially incremented |
| 3 | Method | 2 | AN | Identification code to indicate mark-up method |
| 4 | Description of mark-up method | 24 | AN | Assigned literal to indicate mark-up method |
| 5 | Indicator | 1 | N | Indicates whether mark-up is positive or negative:<br>0 = no mark-up over bank issuer value<br>1 = positive<br>2 = negative<br><br>If value is "0" mark-up value derived from Bank Issuer/Association currency rates table |
| 6 | Mark-up Value | 6 | N | Mark-up value associated with method and indicator |

*Fig. 9A*

| Record Type | Sequence Number | Method | Description | Indicator | Value |
|---|---|---|---|---|---|
| 05 | 0001 | AA | PP Global | 1 | 3.00 |
| 05 | 0002 | AB | PP EURO ^ | 1 | 4.00 |
| 05 | 0003 | AC | Equal Bank Issuer | 0 | - |
| 05 | 0004 | AD | Bank – 50 bps | 2 | 0.50 |
| 05 | 0005 | AE | Bank + 50 bps | 1 | 0.50 |
| 05 | 0006 | AF | Merchant Global | 1 | 2.00 ^ |
| 05 | 0007 | AG | Merchant YEN ^ | 1 | 5.00 ^ |

*Fig. 9B*

| Field | Name | Length | Format | Comments |
|---|---|---|---|---|
| 1 | Record Type | 2 | N | Two digit indicator indicating record type |
| 2 | Sequence Number | 4 | N | Four digit sequence number sequentially incremented |
| 3 | Issuer ARDEF | 9 | N | ARDEF of Issuer card range |
| 4 | Product Code | 4 | AN | Value from Visa, MasterCard, or other card network ARDEF file |
| 5 | Issuer Name | 36 | AN | Issuer name from Visa, MasterCard, or other card/network ARDEF file |
| 6 | Issuer Country | 3 | AN | Country of issuer (from association files) |
| 7 | Issuer region | 2 | AN | Region of Issuer (from association files) |
| 8 | Cardholder Currency | 3 | N | ISO currency code of card billing currency |
| 9 | Total mark-up | 6 | N | Mark-up amount applied to card's International transactions |
| 10 | Bank mark-up | 6 | N | Mark-up amount applied by issuer to cardholder international transactions |
| 11 | Association mark-up | 6 | N | Mark-up amount applied by card association/network to cardholder international transactions |

*Fig 10A*

| Sequence Number | Issuer BIN/ARDEF | Product Code | Issuer Name | Issuer Country | Issuer Region | Cardholder Currency | Total Mark-up | Bank Mark-up | Association Mark-up |
|---|---|---|---|---|---|---|---|---|---|
| 001 | 400115001 | C | Westpac | AZ | AP | 036 | 3.00 | 2.00 | 1.00 |
| 002 | 400116001 | C | UOB | SG | AP | 702 | 3.50 | 3.50 | 0.00 |
| 003 | 400117001 | C | Barclays | UK | EU | 826 | 1.75 | 1.50 | 0.25 |
| 004 | 400118001 | G | MillionCard | JP | AP | 392 | 2.50 | 1.50 | 1.00 |
| 005 | 540005001 | MCB | Duetsch Bank | D | D | 978 | 2.00 | 1.00 | 1.00 |
| 006 | 540006001 | MCG | HSBC | C | C | 344 | 3.50 | 2.50 | 1.00 |
| 007 | 540007001 | MCC | BNP | D | D | 978 | 1.75 | 1.50 | 0.25 |
| 008 | 540008001 | MCC | Royal Bank of Scotland | D | D | 826 | 3.00 | 2.75 | 0.25 |

*Fig. 10B*

```
          Typical Merchant
          1234 John Street
           Anywhere, USA August 23, 2002
Visa # 43211234567894321
Expires 10/04
Auth Code 543632

Purchase Amount . . . $100.00

_____
              Signature

This transaction has been converted
with FX Transact™ into [JPY] [12143]
at a rate of [121.4321]. By signing
above, you acknowledge that you were
offered a choice of currencies in
which to perform this transaction,
you have chosen [JPY] as the
Transaction Currency, and you
understand this choice is final.
```

```
        Typical Merchant
        1234 John Street
         Anywhere, USA

August 23, 2002
Visa # 43211234567894321
Expires 10/04
Auth Code 543632

Transaction Amount ... $100.00

Tip Amount . . .        _____

Total Amount . . .      _____

_____
                       Signature

This transaction has been converted with
FX Transact™ into [JPY] [12143] at a rate
of [121.4321] and any gratuity will be
converted at the same rate. By signing above,
you acknowledge that you were offered a
choice of currencies in which to perform
this transaction, you have chosen [JPY],
as the Transaction Currency, and you
understand your choice is final. If you
wish to perform the transaction in the
above US$ amount, please sign here:
_____
```

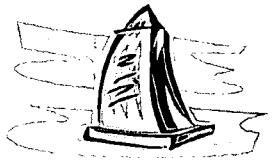

*The Shoebox Hotel*
*Manhattan, New York*

<u>Guest Folio</u>
The Shoebox Hotel, Manhattan, New York, 12/28/02          Cashier: Employee 1
                                                          Printing Time: 12:01 PM

| | |
|---|---|
| Mr. Joe Guest | Arrival: 12/26/02 |
| 111 Oak Lane | Departure: 01/01/03 |
| Oaktown, USA 11111 | No. in Party: 1 |
| | Room #: 1111 |
| | Folio #: 1111111 |
| | Page: 1 |

| Date | Description | Amount |
|---|---|---|
| 12/27 | Room Charge | $199.00 |
| 12/27 | Room Tax | $19.90 |
| 12/28 | Acme Bar and Grill: Check # 1234 | $25.00 |
| 12/28 | Tel – O/seas Call: 011441111111 | $2.74 |
| 12/28 | Total Due | $246.64 |
| | | |
| | VISA XXXXXXXXXXX2121  10/04 | $246.64* |

I acknowledge personal liability for payment of the above statement and, if the person, company or party indicated by me as being responsible for payment does not make payment, I shall upon demand make immediate payment to you.

*At the time of check-in, you were offered a choice of currencies in which to perform this transaction. You have chosen [JPY] as the Transaction Currency and this choice is final. Per your selection, this transaction has been converted with FX Transact™ into [JPY] [12143] at a rate of [121.4321]. For more information about the FX Transact Service, please visit www.planetpayment.com.

*Fig. 13*

TIME-OF-TRANSACTION FOREIGN CURRENCY CONVERSION

CROSS REFERENCE TO RELATED APPLICATIONS

This application claims the benefit of U.S. Provisional Application No. 60/424,477 filed on Nov. 7, 2002, and U.S. Provisional Application No. 60/457,742, filed on Mar. 26, 2003. Both applications are incorporated by reference herein.

BACKGROUND OF THE INVENTION

1. Field of the Invention

The present invention relates generally to processing credit card transactions involving currency conversion, and in particular to determining the conversion rate at the time of authorization in order to provide a cardholder with the final price of the transaction in the cardholder's billing currency based upon a specific currency exchange rate that is developed by reference to a combination of merchant, merchant location, acquirer, gateway, value-added reseller, currency, card type, transaction type, and/or card issuer.

2. Description of the Related Art

In a credit card environment, a transaction takes place between a merchant and a cardholder. The merchant contracts with an acquiring bank for an account that permits the merchant to accept credit and debits cards (collectively referred to as "credit cards") issued by a card association as a method of payment for sales completed by the merchant. The merchant's account is denominated in a settlement currency, which is typically the same as the legal currency in the jurisdiction where the merchant is located. Furthermore, the currency in which the merchant receives payment is generally the same as the settlement currency (e.g. a U.S. based merchant has a merchant account denominated in U.S. Dollars and receives payment in U.S. Dollars). If a merchant desires to have more than one settlement currency, it establishes multiple settlement accounts at an acquiring bank that can support this, each associated with a specific currency. In a conventional system, the merchant is typically only able to consummate credit card transactions in the settlement currency, and its customer can only view pricing and complete a transaction in the settlement currency. For readability, the term "local currency" is used below to refer to the currency in which the merchant receives settlement.

There is a variety of technology available to enable merchants to accept credit card payments. For example, the merchant may use a stand alone credit card processing terminal separate from the merchant's other business processes. Further, the merchant may use a credit card device integrated within another business application; for example in the case of a hotelier, a solution that is encompassed in a property management system that manages several aspects of the hotel's business. Additional integrated examples include but are not limited to gasoline pumps, electronic cash register (ECR) systems, and the like. The term Point-Of-Sale Device (POS device) is used below to generally describe these devices.

In many cases, the POS device may be connected directly to either an acquiring bank or third-party processor contracted to handle credit card processing functions on behalf of the acquiring bank. The acquirer or third-party processor (collectively, the "acquirer"), in turn is in communication with the card associations for the purpose of authorization and settlement of the credit card transactions. In other cases, the POS device may be connected to the acquirer via a "payment gateway" which is centrally-hosted by a third party and which has connectivity to multiple processors. In still other situations, typically when very large merchants are involved, numerous remote locations may connect to the corporate host central site, akin to an in-house gateway of sorts, for processing. In practice, numerous combinations of the above can and are deployed within the industry.

When the cardholder completes a transaction abroad, or more specifically where a transaction is consummated outside of the country where the issuing bank is located, the currency in which the transaction is denominated (i.e. the merchant's "local currency") is often different than the currency in which the cardholder is billed (i.e. the currency of the card's issuing bank, or the "issuing currency"). Consequently, at some point the transaction amount must be converted from the local currency to the issuing currency so that that the issuing bank can provide a statement to the cardholder in the cardholder's issuing currency.

Conventionally, this conversion is not performed by the card associations at the time of the authorization, but rather occurs after the transaction has been authorized and "batched" (i.e.: submitted by the merchant for payment) during the general card association settlement process. Referring now to FIG. 1, assume that a cardholder 102 from the United Kingdom is visiting the United States and completes a transaction using a credit card denominated in British Pound Sterling Sterling. The cardholder presents the credit card to the merchant whose merchant account is denominated in United States Dollars. Assume also that US $150=£100 on the wholesale market. If the cardholder purchases an item for $150 from merchant 104, the transaction between the cardholder and the merchant will be both completed in and sent to the card association in U.S. dollars. The merchant then sends the transaction record to its acquirer 106, which is responsible for obtaining payment on the merchant's behalf. The acquirer 106 forwards to the card association 108 the transaction record, still denominated in U.S. dollars. The card association 108 determines that the issuing currency is British Pound Sterling, and converts the transaction into that currency using a wholesale rate established by the respective card associations. At this point in the settlement process, the card association conventionally applies a markup percentage, illustrated in FIG. 1 as a 1% markup, raising the converted transaction amount to £151. Next, when the card issuer 110 receives the transaction, it typically applies its own markup to the transaction, e.g., a 2% to 4% markup, which in this case raises the transaction amount to £103 if the markup is 2%. The new amount, as converted by the card associations and issuing bank and including the fees imposed by the card association and issuing bank, in this case £103, or US $4.50 more than the original purchase price, is then provided to the cardholder, typically on the cardholder's next billing statement. At some point in the future, the cardholder is presented with a statement that lists the final converted amount of the transaction in the issuing currency. Depending upon the specific business practices of the issuing bank, the exact manner in which the conversion was achieved (e.g., the actual conversion rate applied to the transaction and the specific fees imposed by the card association and issuing bank) is typically not clearly disclosed to the cardholder. Thus, in this conventional model, the card association 108 and the card issuer 110 receive a profit on the conversion markup, but the merchant and the acquirer do not. Furthermore, the cardholder is not able to determine the final amount of the transaction in his local currency at the time of the transaction, but rather will discover the amount of the transaction in the issuing currency only upon receiving his next billing statement. Further, even then he may not be able to determine the exact manner in which the final amount was calculated due to this lack of disclosure on the part of the card association and issuing banks. The cardholder does not have any opportunity to reject the conversion itself or choose some other institution or entity to provide the currency conversion.

In view of the foregoing, a need therefore exists for a foreign exchange payment system that allows a merchant to present a cardholder with the final price of a credit card transaction denominated in the cardholder's issuing currency at the time of the transaction. In addition, a need exists for a way to allow merchants, acquirers, processors, payment gateways and point-of-sale device providers and other participating parties in the transaction stream to facilitate a time-of-transaction currency conversion service without requiring broad changes to such parties' processing and accounting infrastructures.

SUMMARY OF THE INVENTION

The present invention enables a method of performing a time-of-transaction currency conversion (hereafter TOT currency conversion) from the currency in which the merchant sells goods or services to the currency in which the cardholder's credit card is denominated utilizing a rate that is specifically developed by reference to the particular merchant, acquirer, card association and issuer. More specifically, in one embodiment, at some point after a merchant has generated an authorization request in the merchant's currency for a transaction by a cardholder in a different currency, but before authorization, the authorization request is identified as being one for which currency conversion is appropriate. The transaction amount in the authorization is converted from the merchant's currency to the currency of the cardholder's issuing currency, and optionally modified to include additional fees. The converted authorization request is then transmitted to the appropriate card association and then to the issuing bank for authorization. An authorization response approving the transaction is transmitted back ultimately to the merchant. The cardholder thus sees the transaction and can approve it in the cardholder's issuing currency, rather than in the merchant's currency, and in an amount that accurately reflects the appropriate currency conversion rates, markups and fees for the transaction.

One of the benefits of the invention is that the currency conversion takes place without requiring the merchant to perform significant modifications to its hardware systems, such as its POS devices. Likewise, the invention can operate without requiring conversion software or hardware to be installed at the card association, acquirer bank, or issuing bank. Another advantage of the invention is that it may be deployed at any of the institutions that participate in the transaction authorization chain thereby allowing the invention to "power" the various parties to a transaction to participate in the time of transaction conversion process. For example, the invention can be embodied as an application that integrates within the processing system of an acquiring bank, either directly or through the participation of a third-party processor whom the acquiring bank has outsourced certain of the credit card processing function and allows the acquirer to submit transactions to the card associations denominated in certain designated foreign currencies, while receiving in return settlement in the merchant's local currency.

Another aspect of the invention is its support of native currency accounting by each participant in the transaction process. More particularly, the merchants, acquirer, card association, and issuing banks all receive reconciliation, retrieval, chargeback, and interchange reports that provide transaction level detail for each converted transaction, including all relevant fees, markups, and other amounts in their local currency, and in the issuing currency of the particular transaction. This feature enables each institution to perform the appropriate internal accounting without having to perform any further currency conversion steps to the reported data.

The invention also encompasses various methods for enabling the cardholder to select whether the currency conversion should be performed via TOT conversion or the conventional method via an opt-out mechanism. The present invention also includes disclosure and opt-in processes that are adapted to specific transaction environments. These include disclosures for the lodging, restaurant, and retail environments.

In another aspect of the invention, a preprinted transaction slip is provided that is to be signed by the cardholder to approve the transaction. The transaction slip includes preprinted information that describes the currency conversion process as it pertains to the cardholder, and includes information that enables the cardholder to opt-out of conversion process if desired, and allow his transaction to be converted instead by the card association and his issuing bank. Thus, the cardholder has the ability to decide which institution will perform the currency conversion, unlike existing approaches which do not give the cardholder any choice at all. The preprinted information may also provide a contract that guarantees the cardholder that the conversion rate applied to the transaction will be better than the conversion rate applied by the card association. These features give the cardholder a degree of flexibility in using the conversion process that is not available currently.

BRIEF DESCRIPTION OF THE DRAWINGS

FIGS. 6A and 6B illustrate layout and content of an acquirer ID table in accordance with an embodiment of the present invention.

FIGS. 7A and 7B illustrate a layout and content of a base rate conversion rate table in accordance with an embodiment of the present invention.

FIGS. 8A and 8B illustrate a layout and content of a merchant ID cross reference table in accordance with an embodiment of the present invention.

FIGS. 9A and 9B illustrate a layout and content of a markup method table in accordance with an embodiment of the present invention.

FIGS. 10A and 10B illustrate a layout and content of an issuer/association international transaction fee table in accordance with an embodiment of the present invention.

FIG. 11 illustrates an example of a receipt with disclosure and conversion rate information in accordance with an embodiment of the present invention.

FIG. 12 illustrates an example of a receipt in a restaurant environment with disclosure and conversion rate information in accordance with an embodiment of the present invention.

FIG. 13 illustrates an example of a receipt in a lodging environment with disclosure and conversion rate information in accordance with an embodiment of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
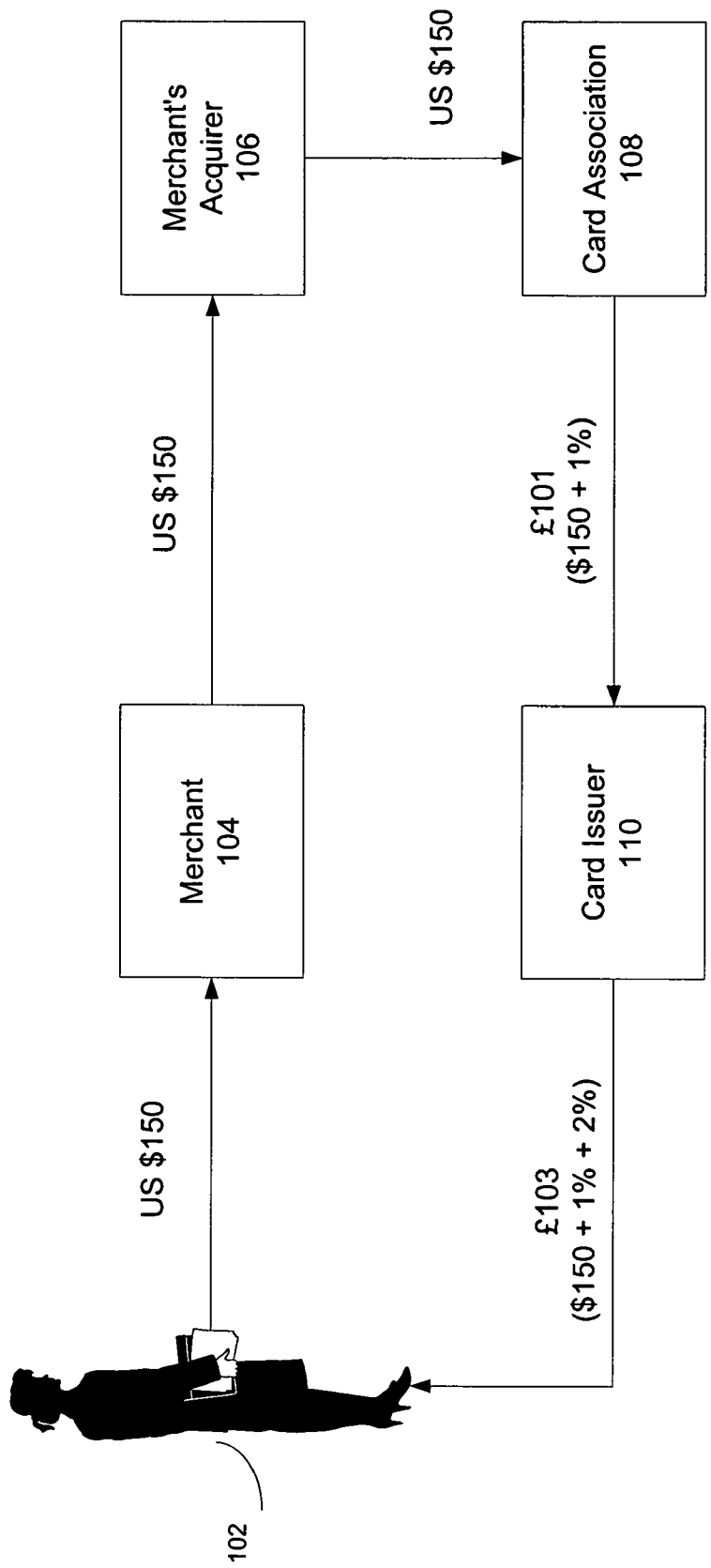
FIG. 1 is a diagram illustrating a conventional method of foreign currency conversion in a credit card transaction.
Figure 2:
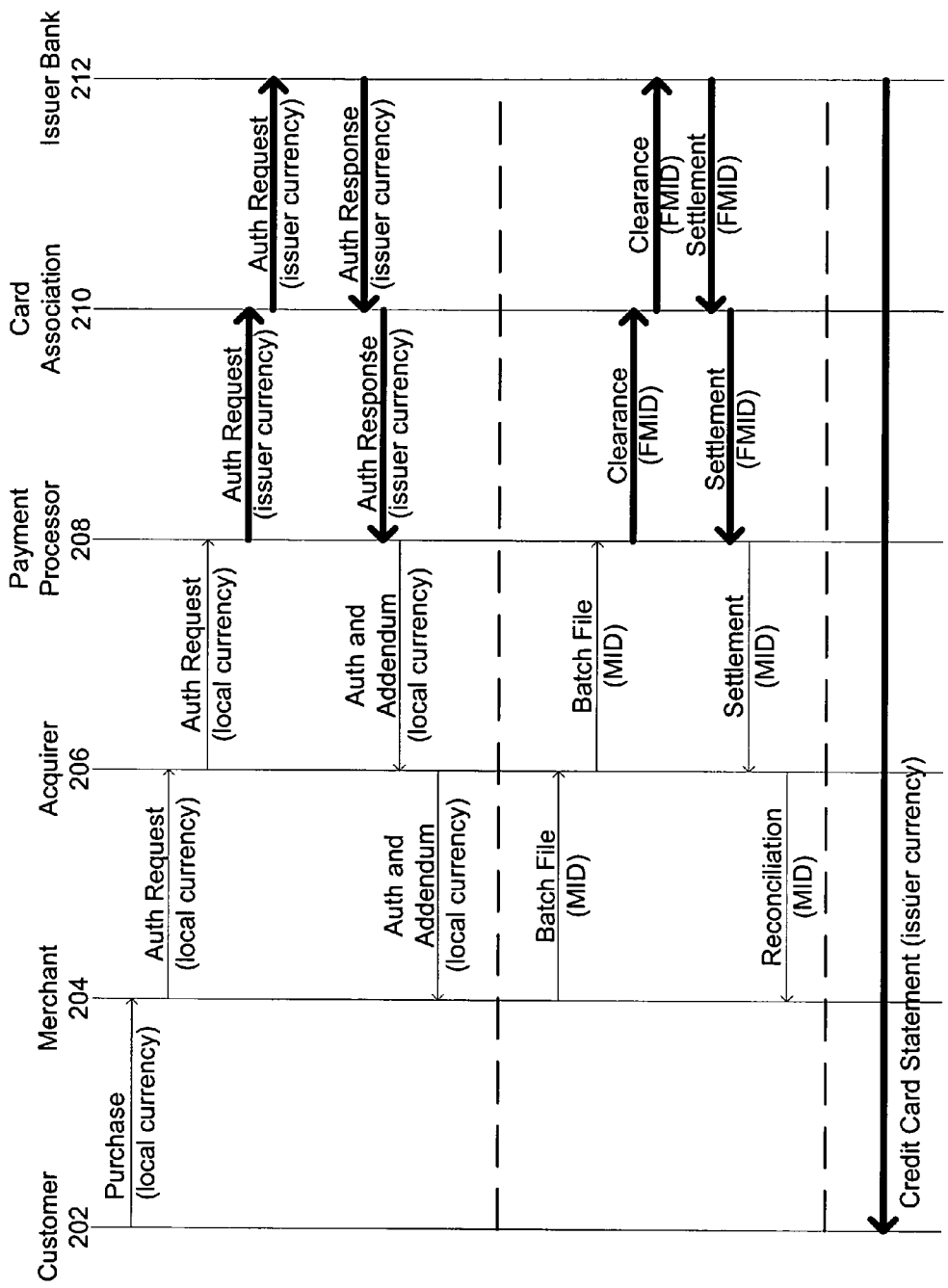
FIG. 2 is an interaction diagram illustrating data flow in a foreign currency credit card transaction in accordance with an embodiment of the present invention.

Generally speaking, in a preferred embodiment of the present invention, the flow of events is as illustrated in FIG. 2. The flow starts when a cardholder 202 initiates a credit-card purchase (or refund) from a merchant 204 that has agreed to participate in the TOT service. In other instances, the merchant may initiate the charge automatically, for example as part of a subscription service. The cardholder's credit card is denominated in an issuing currency which is different from the merchant's local currency. The transaction between the cardholder 202 and the merchant 204 is denominated in the merchant's local currency, which is the currency in which the merchant receives settlement for the transaction from the merchant's acquirer.

Merchant 204 preferably uses a POS device designed to support the TOT process by comparing the credit card number used in the transaction against an account range file containing credit card prefixes of all credit cards to which TOT can be applied. In an alternative embodiment, the identification of TOT-eligible transactions occurs at a payment gateway that includes the account range file.

In the event that a transaction is identified as TOT-eligible, the authorization request is transmitted to the payment processor 208, which converts the transaction in a manner described below. Payment processor 208 then modifies the initial authorization request by expressing the transaction amount in the issuing currency as well as populating certain additional data fields. Payment processor 208 sends the modified authorization request to the appropriate card association 210, which in turn forwards the request to the issuing bank 212. An authorization response is then returned through the card association 210 back to payment processor 208. Payment processor 208 modifies the return authorization response received from the card association by including certain additional data fields containing currency conversion information. The additional data elements contained within the modified authorization response are used by the POS device of the merchant 204 to inform the cardholder 202 about the conversion process and to elect to opt in to the TOT. The cardholder 202 can then approve the transaction knowing the final amount of the transaction in his issuing currency, together with the applicable conversion rate applied to the transaction.

At some time subsequent to the completion of the transaction between the cardholder and the merchant, and in one embodiment on a daily basis, the merchant POS device 204 responsible for filtering transactions through the card account range file 205 (FIG. 5) sends a record of its recent TOT transactions (preferably as a batch file) to payment processor 208. In one embodiment, merchant POS device 204 sends the file directly to payment processor 208. In an alternative embodiment, merchant POS device 204 sends the file to acquirer 206, which then passes the file to payment processor 208. If the merchant POS device 204 has not already segregated authorized TOT transactions from authorized non-TOT transactions, then the account range file 205 is preferably used once more to extract the TOT transactions to create and send the TOT-only batch to payment processor 208. Payment processor 208 then arranges for clearance and settlement with the card association 210 and issuing bank 212 in the issuing currency, and pays the settlement to the acquirer 206 in the local currency. Ultimately, issuing bank 212 processes the charge in the issuing currency and it appears on the cardholder's credit card statement. The amount of the converted transaction as it was quoted at the time of the transaction will match the amount on the credit card statement. Thus the cardholder will not be surprised by additional fees appearing after the transaction was completed.

As is clear from this process flow, the conversion from the merchant's currency to the issuing currency occurs at authorization time, and not at settlement and clearing time, as is done conventionally. In addition, the currency conversion step can apply a conversion rate selected from among many different potential conversion rates, according to specified parameters, as is described further below.

Figure 3:
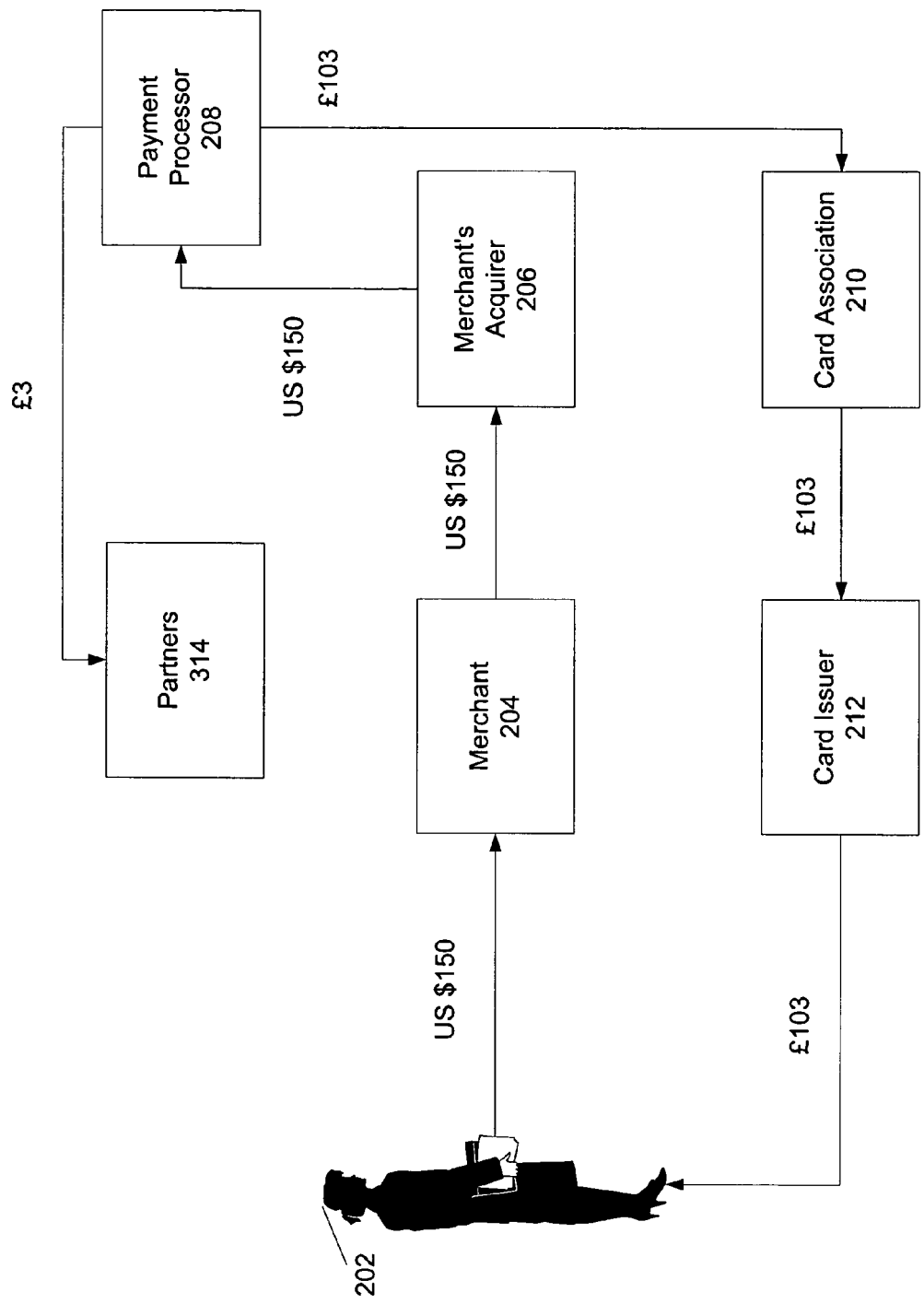
FIG. 3 is a diagram illustrating a method of foreign currency conversion in a credit card transaction in accordance with an embodiment of the present invention.

FIG. 3 illustrates an example of the process just described. Assume that the cardholder's issuing currency is British Pounds, the merchant's local currency is U.S. Dollars, and the wholesale foreign exchange rate is US $150=GBP £100. Cardholder 202 makes US $150 worth of purchases at merchant 204, presenting his credit card for charging the purchase. Merchant 204 initiates an authorization request, which includes the transaction amount as US $150. This authorization request passes through the merchant's acquirer 206 (or technology company) via the POS device described above that identifies the transaction as TOT-eligible and is then forwarded on to payment processor 208 as a U.S. Dollar transaction requiring conversion of the transaction amount into the cardholder's currency (British Pounds). Payment processor 208 determines a conversion factor and calculates a transaction total in British Pounds based on that conversion factor. Payment processor 208 also adds any fees or markups as appropriate, such as fees charged by the processor 208 for performing the service, or fees charged by the acquirer, merchant, or issuing bank for handling a foreign currency transaction. The payment processor 208 then sends a modified authorization request for the converted transaction to the card association 210 reflecting a British Pounds-denominated transaction together with certain data elements contained within the authorization request. The card association 210 in turn then forwards the transaction to the card issuer 212 as a British Pounds-denominated transaction. The card issuer 212 determines whether to authorize the converted transaction, and does so with the transaction being in the issuer's currency (here, British Pounds), rather than being in the merchant's currency. Thus, it is one of the advantages of the present invention that card issuers receive transactions in their own currency, and need take no further steps to convert the transaction. Once authorized, an authorization response for the converted transaction is transmitted back through to the card association 210, to the processor 208, and on to acquirer 206 and the merchant's POS Device 204. The merchant's POS Device 206, using the additional data fields within the authorization response, performs the opt-in function described below. In the event that the cardholder elects to opt-in, the POS device prints a receipt with the requisite currency conversion disclosure. In the event that the customer declines to opt-in, the POS device prints the receipt in U.S. Dollars and the foreign exchange system submits the settlement file in U.S. Dollars. The authorization response will include the total amount of the transaction, in the issuing currency, including any fees as well. The processor 208 maintains data that summarizes the details of the transaction, for latter reconciliation reporting.

Note in FIG. 3 that although US $150=GBP £100, the amount passed by payment processor 208 to card association 210 is £103. This reflects a markup of £3 taken by the payment processor. The cardholder sees this total amount on the transaction slip, and thus knows at this point the total amount of the transaction in his (and the issuing bank's) currency. The markup amount can be variously shared amongst the payment processor's partners 314. Typically, partners 314 are those entities involved in helping to complete the transaction on the processor's behalf, and may include, for example, the merchant's acquirer 206, a value-added-reseller (VAR), etc. Also note that since the card association 210 and card issuer 212 receive the authorization request in the issuing currency at clearing, they do not convert the amount to another currency, and consequently do not add an additional markup.

The steps involved in determining a conversion rate and markup amount are described now in greater detail.

Consider first the authorization request received by payment processor 208. As discussed above, the authorization request is sent by the merchant POS 204 denominated in the merchant's local currency. In a preferred embodiment, the authorization request complies with the VISA EIS 1080 standard for credit authorization requests. When payment processor 208 sends an authorization request to card association 210, it is in the issuing currency. Accordingly, payment processor 208 has to determine a conversion from an amount in merchant's local currency to an amount in the cardholder's issuing currency.

Note that, as described above, prior to the receipt by payment processor 208 of the authorization request, merchant POS 204 preferably compares the card number against a range of card numbers in a card account range file, also known as an Account Range Definition file 205. Since each credit card number begins with an identification of the issuing bank (known as the Bank Identification Number, or BIN), a BIN-to-currency lookup can also be performed by Merchant POS 204 to determine the issuing currency. Once the merchant and issuer currencies are known, the merchant POS 204 sends the transaction to payment processor 208, which determines whether it can convert this transaction. A particular transaction may not be supported if, for example, the payment processor is not configured to convert to/from a particular currency, for either legal, contractual or technological reasons.

Figure 4:
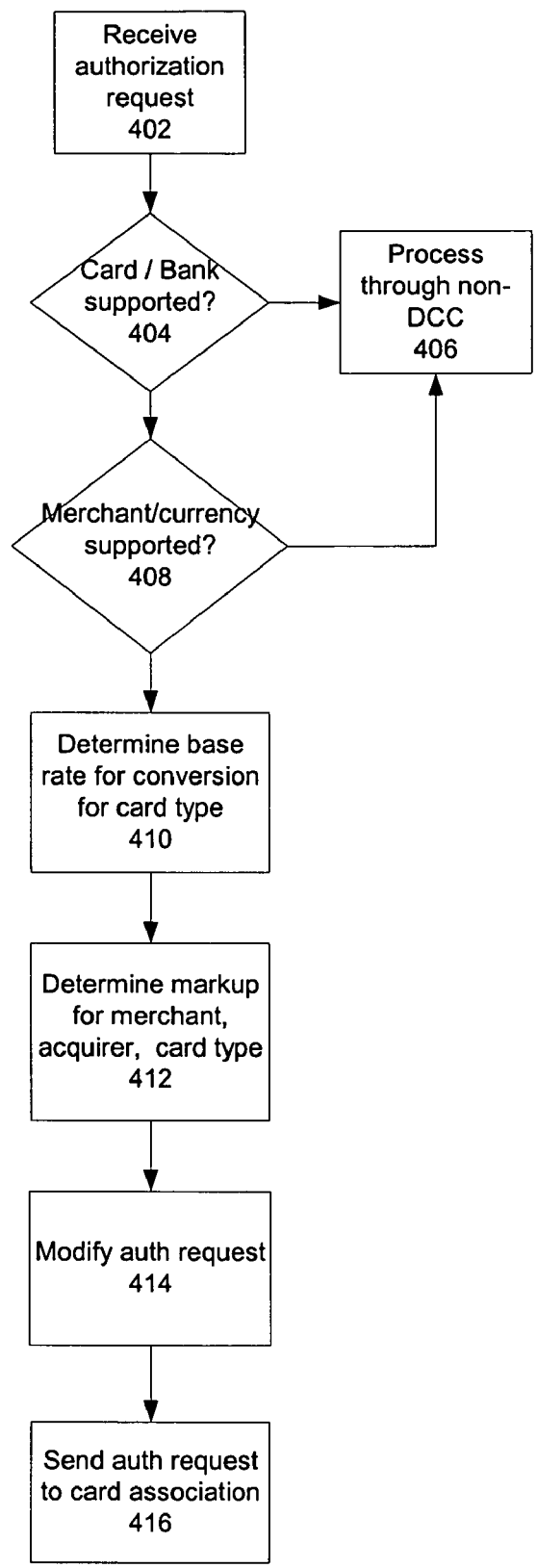
FIG. 4 is a flow chart illustrating a method of foreign currency conversion in a credit card transaction in accordance with an embodiment of the present invention.

FIG. 4 is a flowchart of steps taken by payment processor 208 when authorization request is received in a preferred embodiment. Payment processor 208 determines after receiving 402 the authorization request from merchant POS 204 whether 404 the particular card product and issuing bank are supported for the conversion process. The processor 208 in one embodiment maintains an independent list of card number ranges that it supports. Again, each range is associated with a particular issuer, and with a particular card product (e.g., gold card, secured card, etc.). If the card number of the credit card is not within a range that is supported, then the transaction is processed 406 in a conventional manner. If the card is within card number range that is supported, then the payment processor 208 next confirms 408 whether that the merchant/currency combination truly is supported. Again, because of legal, contractual or technical requirements, a particular merchant may not be entitled to have transactions converted by the payment processor 208 despite the fact that the card account range file 205 indicated the issuing currency was generally supported by the payment processor 208. This could occur, for example, if the card account file 205 was not correctly updated to reflect new data, and the transaction should not have been forwarded to the payment processor 208. If the payment processor 208 determines the merchant/currency combination is not supported, then the transaction is processed in a conventional manner.

If the card number is within an allowable range according to the card account range file 205, and the merchant/currency combination is supported according to the payment processor 208, then payment processor 208 determines 410 a base rate for converting between the merchant's local currency and the cardholder's issuing currency for transactions involving the specified card type. This determination is described further below in greater detail. After the base rate is determined, a markup is then determined 412, based on any combination of the identity of the merchant, the acquirer, the currency, the transaction type, the issuer, and the card type. This determination is also described below in greater detail. Once the base rate and markup are determined, the authorization request is modified 414 to include additional data including the converted amount in issuing currency, and the modified authorization request is then sent 416 to the card association 210.

In a preferred embodiment, the determination of the conversion rate applied by the payment processor 208 can depend on a number of variables, including the merchant, the acquirer, the credit card type, the issuing bank, the transaction type, currency, and a clearance interval. To illustrate the manner in which these variables can affect the conversion rate, it is helpful to describe an example of a system architecture in which the present invention can be implemented.

Figure 5:
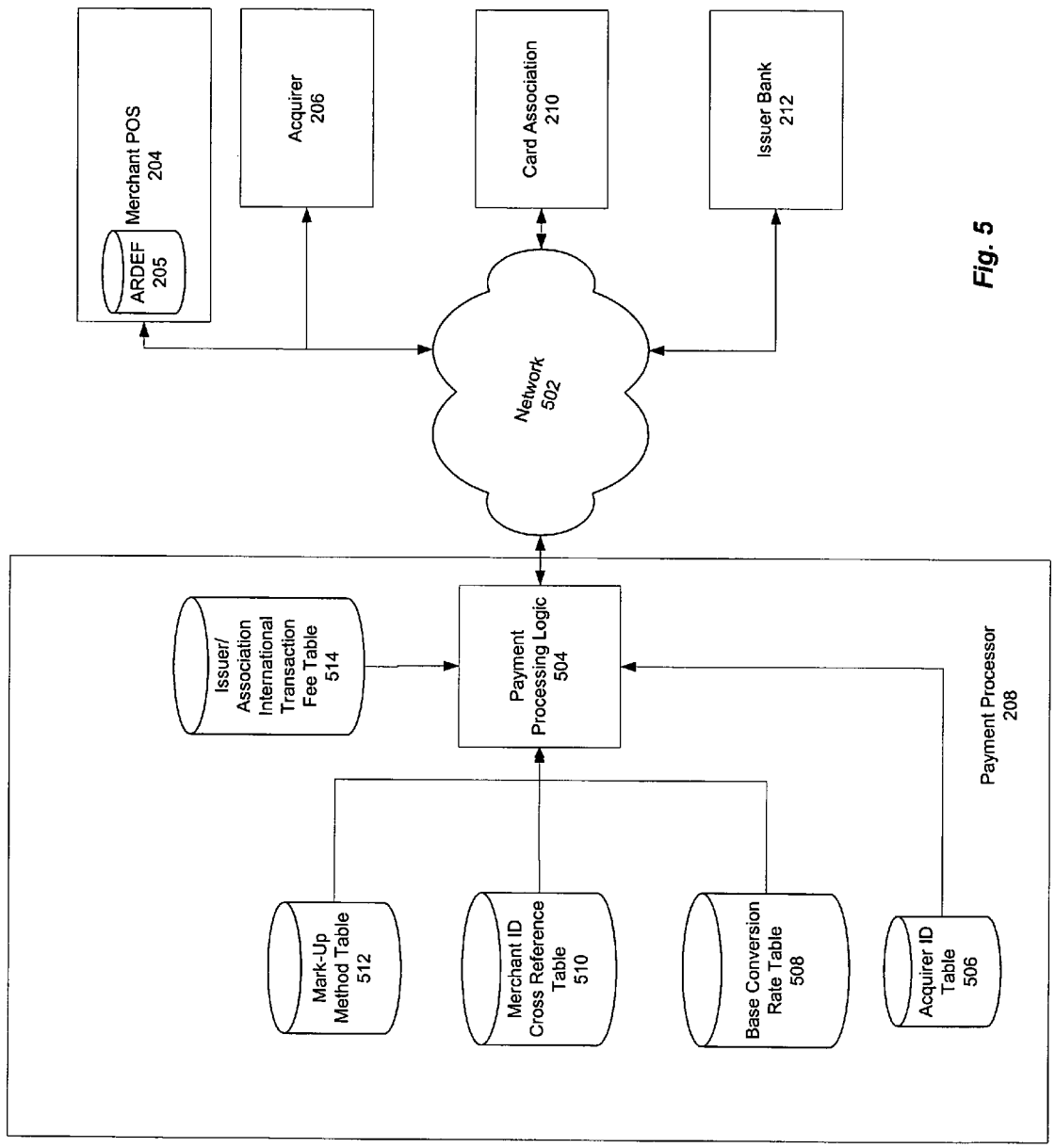
FIG. 5 is a block diagram of a system in accordance with an embodiment of the present invention.

FIG. 5 illustrates a system architecture in accordance with an embodiment of the present invention. FIG. 5 includes merchant POS 204, acquirer 206, card association 210 and issuer bank 212 connected to network 502. In one embodiment, merchant POS 204 includes an Account Range Definition table (ARDEF) 205, described below, and is connected to a gateway, which in turn is connected to network 502. Those of skill in the art will recognize that there are a number of ways in which transactions generated at a merchant can be communicated over a network, and the particular implementation chosen is not germane to the present invention, except as necessary to provide the functionality described. Network 502 can be any suitable network for allowing fast, reliable and secure communication, including ATM, frame relay, Internet VPN, and telephone dial-up access. Also connected to network 502 is payment processor 208. Payment processor 208 includes payment processing logic 504, which performs the operations required to carry out currency conversions in the manner described herein. Payment processor 208 also preferably includes several data files used to determine applicable values for variables in the conversion process.

One function of merchant POS 204 is to identify a foreign transaction that is eligible for conversion by payment processor 208. The merchant POS 204 compares the credit card number used in the authorization request against a range of credit card numbers identified by the ARDEF table 205. The ARDEF table 205 preferably contains the prefix of account numbers of credit cards that are denominated in a currency that is supported by the payment processor service. The merchant POS 204 preferably obtains, e.g., via download, an updated ARDEF table from payment processor 208 or an affiliated entity on a periodic basis to ensure that the most current ARDEF table 205 is being used. The authorization request generated by merchant POS 204 is preferably configured to make use of the Group III addenda record provided for by the VISA EIS 1080 standard for credit card authorizations in order to support the extra functionality offered by payment processor 208. Those of skill in the art will appreciate that other standards exist for obtaining authorization and creating addenda to authorization requests, and any suitable type of authorization request can be used with the present invention in alternate embodiments.

If merchant POS 204 identifies a credit card as denominated in a domestic currency (e.g., identical to the merchant's local currency), then the transaction is directed to the merchant's domestic acquirer and routed as normal to the incumbent acquirer without any intervention by payment processor 208. When a transaction has been identified as TOT-eligible, the merchant POS 204 forwards the authorization request to payment processor 208 for further handling.

Note that in the illustrated case of FIG. 5, payment processor 208 is shown at a remote location from merchant POS 204. However, in an alternative embodiment, payment processor 208 resides at the acquirer's location 206, and is attached as an application to the acquirer's existing infrastructure. In either embodiment, the functionality of payment processor 208 is similar, and the particular implementation is not of significance to the present invention. Payment processor processes can in fact be spread across any incumbent or new parties while still maintaining the same functionality.

Upon receiving the authorization request from the merchant POS 204, payment processing logic 504 checks whether the merchant's acquirer is a participant in the TOT conversion program. The merchant's ID (MID) forms part of the authorization request, and the acquirer associated with the merchant is preferably determined using a lookup table. Once the acquirer is known, another lookup table 506 can be consulted to determine whether the acquirer is part of the TOT conversion program. In one embodiment, the format of table 506 is shown in FIG. 6A, and an example of a table 506 is shown in FIG. 6B.

Thus, for example, if the Acquirer ID for the acquirer 206 associated with merchant 204 is 0001, then the acquirer is First Bank of America, and the Bank's status is Active, meaning that First Bank of America is an active participant in the time-of-transaction currency conversion process.

Next, payment processing logic 504 determines a base conversion rate associated with the specified acquirer, merchant, currency, and card type. In a preferred embodiment, an Acquirer Base Conversion Rate Table 508 has a layout illustrated in FIG. 7A. An example of a table 508 is illustrated in FIG. 7B.

Using base conversion rate table 508, the payment processor 208 determines the correct conversion base rate. A base rate is preferably the spot rate before any markup, as published by the indicated rate source, which in a preferred embodiment is either Visa or Mastercard. For example, in the table shown in FIG. 7B, sequence number 0003 indicates that on Aug. 20, 2002, the base rate as published by Mastercard for converting from British Pounds (currency code 826) to US Dollars (currency code 840) is 1.580. That is, GBP £100 is equal to US $158 at the base rate. In the illustrated embodiment, the table also includes rates valid over different time intervals. For example, continuing with sequence 0003, interval A is a two day period. During interval A, the rate is again 1.580. However, during interval B, which is a period of 5 days, the rate is 1.536. The intervals are used for merchants who need to authorize a transaction at the time of transaction, but who may not actually be able to post the transaction until some days later. This might be the case, for example, for a mail order retailer taking credit cards over the telephone. In that case, the authorization is done at the time the order is placed, but the cardholder's card is not actually charged until the product ships. Typically, payment processor 208 will not want to see a delay between authorization and clearing, particularly if it is contractually obligated to bear the risk of a change in currency conversion rates. Accordingly, the base rate the payment processor offers for longer intervals reflects the additional risk.

The table structure shown in FIG. 7A shows that the base conversion rate table includes base rates for combinations of processors, merchants, and card types. For example, looking again at FIG. 7B, sequence number 0001 shows that the rate published by Visa for converting Pounds to US Dollars is 1.588—less favorable to the American cardholder than was the Mastercard rate of 1.580.

Once the base currency conversion rate is determined, payment processing logic 504 determines a correct markup to apply to the conversion. In a preferred embodiment, payment processor 208 includes a merchant set-up file containing a list of merchants permitted to use the TOT service as well as a mark-up method to be used for each of the merchant's international transactions. This data may be formatted in a variety of ways, and in one embodiment is included in a Merchant ID Cross Reference Table 510 and a Mark-Up Method Table 512, both illustrated in FIG. 5 as part of payment processor 208.

Merchant ID cross-reference table 510 uses the merchant's identification (MID) to identify a merchant acquirer, merchant base settlement currency, markup method, foreign MID, and foreign MID clearing currency. Each of these fields is explained further below. An example layout of table 510 is illustrated in FIG. 8A.

The domestic merchant ID is preferably the merchant ID that is assigned to the merchant by the merchant's domestic acquirer. The acquirer ID is the numeric identifier for the merchant's acquirer. The merchant base currency is the ISO currency code assigned to the currency in which the merchant conducts business, i.e. the local currency. The mark-up method indicates the type of mark-up to be applied to the base rate, as described more fully below. The foreign merchant ID is a currency-specific MID assigned to the merchant for each currency the merchant accepts, for use in the clearing and settlement of foreign currency transactions. The foreign merchant ID clearing currency corresponds to the ISO currency code assigned to the currency associated with the foreign merchant ID of the previous field and to the currency-specific Acquirer BIN for use in clearing the appropriate transactions. FIG. 8B illustrates an example of a table 510.

For example, sequence number 005 indicates that for the merchant having base MID of 123456789, using acquirer 1, the base currency for the merchant is 840 (US Dollars), the Mark-up method is "AE" (see below), the foreign MID is 8321450005, and the foreign MID clearing currency is 702 (Singapore Dollars). Similarly, sequence number 004 indicates that for the same merchant using the same acquirer and having a local of 840 (US Dollars), the markup method is "AA", the foreign MID is 8321450004, and the foreign MID clearing currency is 344 (Hong Kong Dollars).

Mark-up methods are defined by Mark-Up Method Table 512. In one embodiment, fields of table 512 are illustrated in FIG. 9A.

Mark-Up Method Table 512 indicates for each method whether the mark-up for that method is positive, negative, or zero. If the value is zero, then the mark-up method is simply the base rate described above. Also included in table 512 is a mark-up percentage, indicating the magnitude of the mark-up or mark-down. An example of a table laid out in accordance with table 512 is shown in FIG. 9B.

Recall that in the example given above with respect to sequence 004 of table F, the mark-up method was "AF", and for sequence 005 the mark-up method was "AE". As can be seen from Table H, "AA" corresponds to a PP Global type markup, with an indicator of 1 and a value of 3.00. This means that for type AA transactions, the markup applied is a positive 3% markup. "AE" corresponds to a Bank +50 basis points markup, with an indicator of 1 and a value of 0.50. This means that for type AE transactions, the markup applied is a positive 0.5% markup to Issuer markup amount. Those of skill in the art will appreciate that various other markup types can be implemented in accordance with embodiments of the present invention.

Thus, using tables 506, 508, 510, and 512, payment processor 208 is able to choose a rate specified for any combination of merchant, acquirer, card issuer, transaction type, card type, clearing interval, and currency. This ability to individually define the conversion rate and markup for any such combination of entities provides the payment processor significant flexibility in configuring the system and in establishing service relationships and fee schedules with individual merchants, issuers, acquirers, gateways, and so forth.

One advantage of this method of payment processing is that since conversion rates can be set at such a fine level of granularity, there is an opportunity to gain a competitive advantage by quickly adjusting rates to guarantee to cardmembers that they will be given a better rate than what is offered by incumbent competitors, i.e. card associations and issuers, that are using conventional methods of converting transactions between currencies. For example, if payment processor 208 is aware that the rate that will otherwise be obtained by a British Visa cardholder issued by Bank of London having the Visa Association convert US Dollars to British Pounds is US $1=£0.55, then the payment processor d10 can seek a competitive advantage by offering a conversion of US $1=£0.60, representing a potential savings of £0.05 to the cardholder.

Another advantages that the table driven logic provides is the ability to selective include or exclude any particular merchant, acquirer, issuer, card product, or combination thereof.

FIG. 10A illustrates a layout in one embodiment of a table 514 for storing the markups applied by issuing banks and card associations. An example of a table organized according to the fields of FIG. 10A is illustrated in FIG. 10B.

In the example above, sequence number 0002 indicates that Issuer having the name UOB and BIN 400116001, is located in Singapore, in the Asia Pacific region, and issues cards in the currency 702, which is ISO code for Singapore Dollars. The table also shows that the total markup for this conversion is 3.50%, all of which is the kept by the Issuer. Accordingly, so long as payment processor d10 offers a markup of less than 3.50% over the base rate, it will provide a better rate to the cardholder.

In one embodiment, a payment processor can offer a "guaranteed" better rate, in which the method type (FIG. 9B) is set to always beat the conventional 3% markup over the base rate. For example, markup method AD, "Bank –50 bps" indicates that the markup should actually be a markdown of 50 basis points below the rate charged by the association and issuer.

Once the converted and marked-up amount in the issuing currency has been determined, payment processor 208 constructs an authorization request using the converted currency amount, and transmits the request to card association 210 as described above. Payment processing logic 504 populates fields of a Group III addenda to the authorization request before transmitting the request to the card association.

In a preferred embodiment, merchant POS device 204 makes use of modifications to the Visa External Interface Specification 1080 in order to enable opt-in functionality to payment processor 208, and to enable disclosure of currency conversion data to cardholder 202. Authorization requests sent between the merchant POS device 204, payment processor 208, and card association 210 and issuer bank 212 preferably follow the VISA EIS 1080 standard modified as described herein for use in connection with the TOT process, and specifically, the inclusion of certain data fields which allow the passing of currency conversion information. As is known by those of skill in the art, the EIS 1080 standard includes support for additional configurable fields. In a preferred embodiment, payment processor 208 is configured to use a Group III addenda to the standard in the authorization request and response to support time-of-transaction currency conversion. Those of skill in the art will readily recognize that in alternative embodiments, use may be made of other authorization record format specifications modified for use in connection with the TOT service through inclusion of additional data fields to facilitate the transmission of currency conversion information.

When transmitting the authorization request to payment processor 208, the merchant POS device 204 preferably makes use of an opt-out flag field of the Group III addenda record, which allows payment processor 208 to return to the merchant POS device 204 the same Group III addenda with the necessary currency conversion transaction information. In most instances, since the cardholder has not been afforded the opportunity to opt-in at the time of the authorization request, the opt-out flag is defaulted to "No." In one embodiment the addenda record is of the following format:

| III | 1 | NUM | 4.38 | Group III Version Number | N or Y | "500" |
|---|---|---|---|---|---|---|
|  | 1 | A.N | New field | Dynamic Currency Conversion Opt-Out Flag | | |

When payment processor 208 receives the authorization response from the card association, the foreign exchange system recognizes a transaction as TOT-eligible based and returns an authorization message to the POS device containing additional currency conversion information within the Group III addenda record. In one embodiment the addenda is of the following format:

| Group | Field | Length | Format | Reference | Contents | Comments |
|---|---|---|---|---|---|---|
| III |  | 3 | NUM | 4.38 | Group III Version Number | "500" |
|  |  | 12 | NUM | New field | Cardholder transaction amount, 2 decimal places implied | |
|  |  | 3 | A/N | New field | Currency Code (expressed as a literal, e.g. GBP) | |
|  |  | 10 | NUM | New field | Conversion rate used to determine cardholder transaction amount, and used in conjunction with currency exponent. | |
|  |  | 1 | NUM | New field | Currency Exponent, an indicator for | |

-continued

| Group | Field | Length | Format | Reference | Contents | Comments |
|---|---|---|---|---|---|---|
| | | | | | placing the decimal point in the conversion rate, read from right to left. | |

The addenda to the authorization request/response encodes the issuer currency code, the conversion rate used to convert from the local currency to the issuer currency, and an exponent indicator to identify where the decimal point belongs in the conversion rate field. For example, if the issuing currency is British Pounds (GBP), the amount is £350 and the rate is 0.6297, cardholder transaction amount field would contain "350", the currency code field would contain "GBP", the conversion rate field would contain "0629700000," and the exponent indicator field would contain "9".

When the payment processing logic 504 determines the marked-up conversion rate and transaction amount, it populates the fields of the addenda record as in the example above. The authorization request sent to the card association 210 is denominated in the issuing currency as contained within the "Cardholder transaction amount" field of the addenda record. When the authorization response is received at the merchant POS device 204, the merchant POS device 204 recognizes the transaction as TOT-eligible bases upon the presence of the addenda. The data in the addenda record is read by the POS device to disclose to the cardholder 202 what will be the amount of the transaction in the issuing currency. This disclosure assists the cardholder 202 in making a decision as to whether to opt-in or opt-out of the TOT process. Disclosure and opt-out decisions are described further below. In addition, the authorization response elements are preferably stored by the merchant POS 204 and some or all are submitted during a clearing process. Note that because the converted amount and the conversion rate are included in the addenda, there is no need for the merchant POS device 204 to be separately aware of any conversion rates. This allows a centralized location such as payment processor 208 to constantly update base rates and markups without having to push the updates to each POS device.

An acquirer's internal processing and accounting infrastructure is typically maintained in one functional operating currency in order to facilitate the reconciliation and funding of merchants, thereby limiting the acquirer's ability to facilitate a TOT service which, by definition, requires the reconciliation and accounting of multiple currencies (e.g., a merchant submitting a British Pound Sterling Transaction into the card associations with the processor receiving settlement from the card associations in United States Dollars). Given the historic limitations of the processors' systems, acquirers are ill-equipped to handle the vagaries of the foreign exchange process from establishing the actual conversion rate applied to a specific transaction to managing developing the methodology to calculate a party's respective share of the margin applied to a foreign transaction which may be effected by either gain or loss on foreign exchange process between the authorization and settlement of a TOT transaction. As a result, in order address these needs, the present invention enables deployment at a acquirer's facility to support a TOT service without wholesale changes to the acquirer's internal systems.

Payment processor 208 enables the reporting of time-of-transfer currency conversions to merchants' acquirers on a transaction level basis in order to assist the acquirers with appropriately crediting or debiting their merchants. One file, called the Cleared Items Confirmation File, is preferably distributed to each of the participating acquirers and contains captured transaction information, including the results on a transactional level of the TOT conversion and card association settlement. Another file, called the Retrieval/Chargeback File, is also distributed to each acquirer, and contains all incoming exception transaction information from the card associations, listed at the transaction level. The file also preferably provides details on the exception regions. A third file, called the Interchange Qualification File, is distributed to each acquirer and contains full interchange expense information, captured transaction information, and includes the results on a transactional level of the payment processor and association settlement and interchange fee assessment. The file enables the payment processor to categorize interchange expenses and allocate those expenses across one or more parties involved in the transactional process.

Data from each of the above files is preferably used to support a Daily Reconciliation/Proof Reporting process. This is a multi-currency accounting process with supporting reports from the payment processor and card associations that enable the payment processor to account to each of the acquirers for all transaction activity received, exceptions processed, and to isolate and report international transaction amount conversion gains and losses. The output from the process is a comprehensive reconciliation and proof report that enables each acquirer to fully account and track its international transaction processing and associated direct revenue and expenses.

Note that a particular merchant participating in the TOT currency conversion program can be configured to support multiple issuing currencies, and may in one day (or, more generally, one batch period) accrue transactions in multiple issuing currencies. In one embodiment, payment processor 208 enables an efficient mechanism for accounting for merchant transactions in multiple issuing currencies.

Recall that each merchant has a domestic merchant ID (MID). Payment processor 208 maps the merchant's MID to a new Foreign Merchant ID (FMID) for each issuing currency supported by the merchant. For example, if the merchant's local currency is US Dollars, and the merchant is configured to accept Canadian Dollars, British Pounds, Euros, Japanese Yen and Australian Dollars for TOT currency exchange, payment processor 208 creates five FMIDs for the merchant, and stores the one-to-many mapping. When the payment processor receives the batched transaction records from the merchant, it uses the mapping to replace the MID with the appropriate FMID in the clearing file for the particular transaction. For example, if the merchant performed a TOT currency conversion transaction for a Euro cardholder, the MID in the transaction record is replaced with the merchant's FMID for Euros. The FMIDs are then each batched together for clearance and settlement under the appropriate currency specific acquiring BIN. Finally, for reconciliation, the FMIDs are mapped back to the original domestic MIDs and reported to the merchant. One benefit of this process is that it allows the processor to reconcile on a transaction level otherwise loose connectivity between original transaction currency/amount and transaction clearing currency/amount and settlement currency/amount.

In a preferred embodiment, it is desirable to obtain the cardholder's consent to participate in the TOT currency conversion process before completing the transaction. One reason for obtaining consent is that it may be a requirement of the card associations and applicable to merchants. Another reason to do so is to give the cardholder the opportunity to choose not to opt out and not participate if he believes the rate he is being quoted by the TOT currency conversion process is too unfavorable, or for personal reasons just does not want to participate. If the cardholder opts out of the transaction, then the transaction is processed in a conventional manner through the merchant's domestic acquirer, and the conversion is made at a later time by the card association.

In order for the disclosure process to be most effective, it is preferable to first advise the cardholder as to the amount of the transaction he will be billed for in the issuing currency, and then to obtain his consent. The manner in which these two steps occur depends on the nature of the transaction. Three examples are illustrative, and they are 1) a retail transaction; 2) a restaurant transaction; and 3) a hotel transaction.

Retail

A process for opting in in the retail environment depends upon the particular functionality of the POS device in use, and whether the device is "customer facing" or "merchant facing", that is whether it is the customer or the merchant operating the device. Preferably, the presentation of the TOT disclosure and consent (opt-in acknowledgement) language is such that if the cardholder simply signs the transaction receipt, the payment processor 208 processes that transaction as a TOT transaction.

If the merchant is using a customer-facing POS device where the cardholder has the opportunity to "key" in portions of the transaction, the opt-in is preferably obtained by displaying consent language on the POS device screen and requiring the cardholder to choose to pay in the issuing currency. Those of skill in the art will appreciate that given the diversity of retail POS applications, and the number of characters that can be displayed on a screen, there are a variety of ways in which to seek and obtain consent from the cardholder.

With a merchant-facing terminal, the opt-in message is preferably addressed by an employee of the merchant who verbally obtains the cardholder's consent and then presses the required key in order to give effect to the cardholder's preference.

Once the cardholder has opted in to the payment processor 208 system, the merchant completes the transaction with the cardholder in the traditional manner (for example, ensuring proper authorization, obtaining cardholder's signature on a receipt, etc). In a preferred embodiment, a field in the addenda record to the authorization method includes an "Opt-In" flag that is set to indicate that the cardholder has opted in. Payment processor 208 checks the flag before clearing the transaction, and will not clear any transactions where the flag is not set for opt-in. Instead of clearing the transaction, payment processor 208 processes the transaction in a conventional manner.

Because the authorization response received by merchant POS 204 includes addenda record information including the conversion rate applied and the total amount of the transaction in the issuer currency, the cardholder can make an informed decision about whether to opt-in. The cardholder is preferably provided with a transaction receipt including the currency conversion information at the time signature is requested for the transaction. In one embodiment, the transaction receipt contains at least the following items:

Price of the transaction in the merchant's local currency;
Price of the converted transaction in the issuing currency, accompanied by the appropriate currency symbol or three letter ISO abbreviation for the currency;
The conversion rate in effect for that date;

A brief explanation of the conversion process.

FIG. 11. illustrates an example of a receipt presented to a cardholder in a retail environment. In region 1102 of FIG. 11, the receipt informs the cardholder of the conversion rate, conversion currency and total converted amount. In the illustrated case, the purchase amount in the merchant's local currency is US $100, the conversion currency is Japanese Yen (JPY), the rate (including any markup) is 121.4321, and the total amount charged to the cardholder in Yen is ¥12143.

Restaurant

Obtaining cardholder consent in a restaurant environment is different from that of a retail environment because, generally, neither the cardholder nor the wait staff is in immediate proximity to the POS device. For example, the waiter generally presents a check to the customer, the customer presents his credit card, the waiter then takes the credit card and runs it through the POS device and returns to the table with a printed receipt. The customer signs the receipt and adds a tip, and the waiter adds the amount of tip into the POS device. Therefore, in the restaurant environment, the disclosure and program consent is preferably obtained from the cardholder entirely within the transaction document presented to the cardholder for signature, and not at a POS device. Consent is preferably obtained by printing the TOT currency conversion disclosure below the existing signature line, with an additional signature line by which the cardholder can inform the wait staff if the cardholder wishes to opt-out.

As in the retail environment, the default is preferably that the cardholder wishes to participate in the TOT currency conversion program. As a result, in a preferred embodiment if the cardholder simply signs the receipt in the appropriate place, the TOT currency conversion will take place. However, if the cardholder does sign the line to opt-out, the payment will be processed through the restaurant's domestic acquirer in a conventional manner.

As in the retail example, given the diversity of restaurant POS applications and the amount of data that is displayable on the screen, there are a variety of ways in which to perform the opt-in procedure. In one embodiment, the wait staff is only prompted when entering the tip to confirm an opt-in for transactions that are eligible for conversion by the TOT process, i.e. the card is part of the range in the ARDEF table 205.

Once the cardholder has opted in, the merchant POS 204 completes the transaction with the cardholder as described above.

In restaurant merchant POS systems 204 that have tip activity, the converted currency amount field in the addenda record of the payment processor authorization response does not include the tip amount. For restaurant transactions, where the Visa EIS "tip amount" is populated with the tip amount (in the merchant source currency), the payment processor 208 determines and validates the cardholder billing amount using the merchant base amount (which includes tip), and the rate provided in the optional data group. As such, for restaurants with tip activity participating in the TOT process, the merchant POS 204 should preferably populate the "tip amount" field according to the Visa EIS 1081 standard.

FIG. 12 illustrates an example of a charge slip that is offered to a cardholder in a restaurant environment in one embodiment. In addition to disclosing the conversion currency, conversion rate and conversion amount, region 1202 also discloses that any tip amount to be added by the cardholder is not included in the conversion amount, but will be added at the same conversion rate disclosed. A second signature line is provided for the cardholder to indicate that he wants to opt-out of the TOT transaction.

Lodging

In a lodging environment (e.g., hotel, motel, inn, etc.), opt-in is obtained in one embodiment by having the cardholder sign or initial the disclosure language printed on a sales draft, folio, invoice or other document signed by all cardholders to complete the transaction in the establishment. An example of such language is:

> As a convenience to our international cardholders, we offer a time-of-transaction credit card conversion service. If you wish to use this service and your Visa® or MasterCard® is eligible for this service, the original local currency amount of the charge will be converted to the currency in which the card is billed at an exchange rate competitive to that offered by your card provider at the time of your check-out.

The disclosure language is preferably displayed on the same sales draft, folio, invoice or other document signed by all cardholders to complete the transaction in the lodging establishment. The disclosure language can be conveyed either pre-printed on the paper, or printed as a literal with other elements of the check-in transaction.

If the merchant employs a "paperless" or express check-in service, then an alternative method for providing disclosure to the cardholder includes a verbal prompt by the counter clerk for the cardholder to participate in the service. If the cardholder approves, that approval is input by the counter clerk into the POS, with the result being a printed confirmation of the cardholder's decision to participate in the service.

Again, the default is preferably to have cardholders opt in to the program. Thus, if the cardholder signs the disclosure, the payment will be processed as a TOT transaction.

In a preferred embodiment, if the cardholder does not opt in to the TOT currency conversion process at initial authorization, any subsequent incremental or reverse authorizations—as well as the clearing file—should include the "opt out flag field" of the Group III addenda record set to "yes."

The information in the Group III Addenda returned to the POS in the authorization response message provided by the payment processor 208 is preferably stored in order to enable later printing of the folio with the conversion information. However, because the payment processor 208 updates exchange rates frequently, the exchange rate used to convert the transaction amount from the merchant's local currency to the cardholder's currency during the authorization process will not be the exchange rate used to convert the final transaction amount printed on the cardholder's folio and submitted to the card association for clearing (unless the authorization and transaction capture occur on the same date).

In order to obtain the updated rates to disclose to the cardholder at checkout, the merchant 204 preferably performs a daily "zero" authorization on each of the cardholder accounts active at the merchant 204 (for example, staying in the hotel). That is, the merchant POS 204 accesses the payment processor 208 for an incremental authorization in the amount of $0.00. These transactions should be identifiable at the merchant 204 by virtue of the Group III addenda record flagged for program participation (that is, the transactions not eligible for TOT conversion will not have a Group III addenda record in the authorization response, and eligible transactions in which the cardholder has opted out will contain a "yes" in the opt out flag field of the Group III addenda record).

Once the updated rates are obtained via the zero-authorization process, the merchant POS 204 preferably stores these rates so that the proper rate is reflected on the folio and settlement file. Additionally, the merchant POS 204 preferably stores these rates for a period of 180 days, in order to ensure that folios requested after check-out are printed with the proper conversion information. For example, if upon returning home, the cardholder calls the hotel for a copy of his bill, the folio can be reprinted and its accuracy verified.

FIG. 13 illustrates an example of a folio presented to a cardholder in a hotel environment at check out in one embodiment. The disclosed the conversion currency, conversion rate and conversion amount are presented based on the results of the zero-authorization run that day, and may differ from the values at check-in.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the payment processor and so forth may be provided in many or one module.

Some portions of the above description present the feature of the present invention in terms of algorithms and symbolic representations of operations on information. These algorithmic descriptions and representations are the means used by those skilled in the credit transaction arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computerized method for processing a credit card transaction, the transaction occurring between a merchant and a cardholder using a credit card of the cardholder, the merchant associated with a local currency, the credit card having an associated issuing currency, the method comprising:
   receiving an authorization request from a credit transaction processing device of the merchant via a first telecommunication network, the authorization request including a transaction amount denominated in the local currency;
   selecting an applicable conversion rate from a plurality of conversion rates between the local currency and the issuing currency;
   converting, by a computer, the transaction amount denominated in the local currency into an amount denominated in the issuing currency using the selected applicable conversion rate;
   forwarding the authorization request to a card association via a second telecommunication network, the forwarded authorization request denominated in the issuing currency;
   receiving via the second telecommunication network an authorization response from the card association, the authorization response denominated in the issuing currency; and
   using a computer, forwarding via the first telecommunication network the authorization response to the credit transaction processing device of the merchant, the forwarded authorization response including the amount denominated in the issuing currency and including conversion information.

2. The method of claim 1 wherein each of the plurality of conversion rates includes one of a plurality of markup rates applied to a base rate.

3. The method of claim 2 wherein the applicable conversion rate is selected according to a card type of the credit card.

4. The method of claim 3 wherein the credit card is issued by a card association and the base rate is further determined according to a wholesale spot exchange rate used by the card association to convert transactions from the local currency to the issuing currency.

5. The method of claim 2 wherein the applicable conversion rate is selected according to an identity of the merchant.

6. The method of claim 2 wherein the applicable conversion rate is selected according to an identity of an acquirer associated with the merchant from which the transaction was received.

7. The method of claim 2 wherein the applicable conversion rate is selected according to a card association that issued the credit card.

8. The method of claim 2 wherein selecting the applicable conversion rate further comprises:
   determining a conversion rate charged by an issuer of the credit card; and
   selecting a conversion rate lower than the determined conversion rate charged by the issuer of the credit card.

9. The method of claim 2 wherein selecting the applicable conversion rate further comprises:
   determining a conversion rate charged by a card association associated with the credit card; and
   selecting a conversion rate lower than the determined conversion rate charged by the card association.

10. The method of claim 2 wherein the applicable conversion rate is selected according to an issuing bank of the credit card.

11. The method of claim 2 wherein the applicable conversion rate is selected according to a settlement clearing interval of the merchant from which the transaction was received.

12. The method of claim 2 wherein the markup of the selected applicable conversion rate is positive.

13. The method of claim 2 wherein the markup of the selected applicable conversion rate is negative.

14. The method of claim 2 further comprising providing a portion of the amount denominated in the issuing currency to a party to the transaction.

15. The method of claim 14 wherein the party to the transaction is the merchant.

16. The method of claim 14 wherein the party to the transaction is an acquiring bank of the merchant.

17. The method of claim 14 wherein the party to the transaction is a point-of-sale technology provider.

18. The method of claim 14 wherein the party to the transaction is a payment gateway provider.

19. The method of claim 1 further comprising producing a transaction report, the transaction report including interchange expenses attributable to the transaction.

20. The method of claim 1 further comprising:
   disclosing to the cardholder the selected applicable conversion rate.

21. The method of claim 20 wherein disclosing the conversion rate comprises printing a transaction record, the record including the transaction amount in the local currency and the issuing currency.

22. The method of claim 20 further comprising:
   obtaining consent from the cardholder to complete the credit card transaction in the amount denominated in the issuing currency.

23. The method of claim 22 wherein obtaining consent from the cardholder further comprises obtaining a signature of the cardholder on a transaction receipt.

24. The method of claim 22 wherein obtaining consent from the cardholder further comprises receiving input from the customer at a point-of-sale device.

25. The method of claim 24 wherein obtaining consent from the cardholder further comprises displaying to the cardholder a transaction amount in the local currency and the issuing currency on the point-of-sale device and receiving a selection of one of the amounts from the cardholder at the point-of-sale device.

26. The method of claim 24 wherein obtaining consent from the cardholder further comprises obtaining the consent verbally.

27. A computer program product for processing a credit card transaction, the transaction occurring between a merchant and a cardholder using a credit card of the cardholder, the merchant associated with a local currency, the credit card having an associated issuing currency, the computer program product stored on a computer readable medium and including code configured to cause a processor to execute the steps of:
    receiving an authorization request from the merchant, the authorization request including a transaction amount denominated in the local currency;
    selecting an applicable conversion rate from a plurality of conversion rates between the local currency and the issuing currency;
    converting the transaction amount denominated in the local currency into an amount denominated in the issuing currency using the selected applicable conversion rate;
    forwarding the authorization request to a card association, the forwarded authorization request denominated in the issuing currency;
    receiving an authorization response from the card association, the authorization response denominated in the issuing currency; and
    forwarding the authorization response to the merchant, the forwarded authorization response including the amount denominated in the issuing currency and including conversion information.

28. The computer program product of claim 27, wherein each of the plurality of conversion rates includes one of a plurality of markup rates applied to a base rate.

29. The computer program product of claim 28 wherein the applicable conversion rate is selected according to a card type of the credit card.

30. The computer program product of claim 29 wherein the credit card is issued by a card association and the base rate is further determined according to a wholesale spot exchange rate used by the card association to convert transactions from the local currency to the issuing currency.

31. The computer program product of claim 28 wherein the applicable conversion rate is selected according to an identity of the merchant.

32. The computer program product of claim 28 wherein the applicable conversion rate is selected according to an identity of an acquirer associated with the merchant from which the transaction was received.

33. The computer program product of claim 28 wherein the applicable conversion rate is selected according to a card association that issued the credit card.

34. The computer program product of claim 28 wherein selecting the applicable conversion rate further comprises:
    determining a conversion rate charged by an issuer of the credit card; and
    selecting a conversion rate lower than the determined conversion rate charged by the issuer of the credit card.

35. The computer program product of claim 2 wherein selecting the applicable conversion rate further comprises:
    determining a conversion rate charged by a card association associated with the credit card; and
    selecting a conversion rate lower than the determined conversion rate charged by the card association.

36. The computer program product of claim 28 wherein the applicable conversion rate is selected according to an issuing bank of the credit card.

37. The computer program product of claim 28 wherein the applicable conversion rate is selected according to a settlement clearing interval of the merchant from which the transaction was received.

38. The computer program product of claim 28 wherein the markup of the selected applicable conversion rate is positive.

39. The computer program product of claim 28 wherein the markup of the selected applicable conversion rate is negative.

40. The computer program product of claim 28 further comprising providing a portion of the amount denominated in the issuing currency to a party to the transaction.

41. The computer program product of claim 40 wherein the party to the transaction is the merchant.

42. The computer program product of claim 40 wherein the party to the transaction is an acquiring bank of the merchant.

43. The computer program product of claim 40 wherein the party to the transaction is a point-of-sale technology provider.

44. The computer program product of claim 40 wherein the party to the transaction is a payment gateway provider.

45. The computer program product of claim 28 further comprising producing a transaction report, the transaction report including interchange expenses attributable to the transaction.

46. The computer program product of claim 28 further comprising: disclosing to the cardholder the selected applicable conversion rate.

47. The computer program product of claim 46 wherein disclosing the conversion rate comprises printing a transaction record, the record including the transaction amount in the local currency and the issuing currency.

48. The computer program product of claim 46 further comprising:
    obtaining consent from the cardholder to complete the credit card transaction in the amount denominated in the issuing currency.

49. The computer program product of claim 48 wherein obtaining consent from the cardholder further comprises receiving input from the customer at a point-of-sale device.

50. The computer program product of claim 49 wherein obtaining consent from the cardholder further comprises displaying to the cardholder a transaction amount in the local currency and the issuing currency on the point-of-sale device and receiving a selection of one of the amounts from the cardholder at the point-of-sale device.

* * * * *

UNITED STATES PATENT AND TRADEMARK OFFICE
CERTIFICATE OF CORRECTION

PATENT NO. : 7,660,768 B2 Page 1 of 1
APPLICATION NO. : 10/704342
DATED : February 9, 2010
INVENTOR(S) : Beck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1739 days.

Signed and Sealed this

Twenty-eighth Day of December, 2010

David J. Kappos
*Director of the United States Patent and Trademark Office*